United States Patent
Zhou et al.

(10) Patent No.: US 8,326,227 B2
(45) Date of Patent: Dec. 4, 2012

(54) SYSTEM AND METHOD FOR SECONDARY COMMUNICATIONS WITH DIRECTIONAL TRANSMISSION

(75) Inventors: Xiangwei Zhou, Atlanta, GA (US); Young Hoon Kwon, San Diego, CA (US); Anthony C. K. Soong, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 995 days.

(21) Appl. No.: 12/249,813

(22) Filed: Oct. 10, 2008

(65) Prior Publication Data

US 2009/0325482 A1    Dec. 31, 2009

Related U.S. Application Data

(60) Provisional application No. 61/077,046, filed on Jun. 30, 2008.

(51) Int. Cl.
   *H04B 1/00* (2006.01)
(52) U.S. Cl. .................. 455/63.4; 455/25; 343/757
(58) Field of Classification Search .......... 455/19, 455/25, 63.4, 279.1, 506, 500; 342/403, 342/405, 423, 432, 434, 437, 445; 370/334; 375/345–349, 267, 316, 147–150, 260, 285, 375/340; 343/754, 853, 757
See application file for complete search history.

(56) References Cited

U.S. PATENT DOCUMENTS

| | | | |
|---|---|---|---|
| 5,812,184 A * | 9/1998 | Martinez | 725/131 |
| 7,363,003 B2 * | 4/2008 | Takatani et al. | 455/13.1 |
| 7,440,728 B2 * | 10/2008 | Abhishek et al. | 455/41.2 |
| 7,792,273 B2 * | 9/2010 | Fano et al. | 379/265.02 |
| 2001/0052875 A1 * | 12/2001 | Kohno et al. | 342/417 |
| 2003/0009621 A1 * | 1/2003 | Gruner et al. | 711/118 |
| 2006/0055831 A1 * | 3/2006 | Onomatsu | 348/725 |
| 2006/0084444 A1 * | 4/2006 | Kossi et al. | 455/450 |
| 2007/0147419 A1 * | 6/2007 | Tsujimoto et al. | 370/466 |
| 2007/0190956 A1 * | 8/2007 | Chen et al. | 455/230 |
| 2008/0026767 A1 * | 1/2008 | Krstulich | 455/452.2 |
| 2008/0090581 A1 | 4/2008 | Hu | |
| 2008/0130519 A1 * | 6/2008 | Bahl et al. | 370/254 |
| 2008/0130715 A1 | 6/2008 | Gorday et al. | |
| 2008/0287066 A1 * | 11/2008 | Tandai et al. | 455/45 |
| 2009/0011773 A1 * | 1/2009 | Balachandran et al. | 455/456.1 |
| 2009/0016290 A1 * | 1/2009 | Chion et al. | 370/329 |
| 2009/0023469 A1 * | 1/2009 | Tomioka et al. | 455/552.1 |
| 2009/0067586 A1 * | 3/2009 | Fano et al. | 379/49 |

(Continued)

OTHER PUBLICATIONS

Mitola, III, Joseph, et al., "Cognitive Radio: Making Software Radios More Personal," IEEE Personal Communications, Aug. 1999, pp. 13-18.

(Continued)

*Primary Examiner* — Dominic E Rego
(74) *Attorney, Agent, or Firm* — Slater & Matsil, L.L.P.

(57) ABSTRACT

System and method for exploiting spatial spectrum holes (SSH) in the time/spectrum/location of wireless resources. A method comprises setting a directional antenna to a first transmission direction, determining a state of a spectrum band in the first transmission direction, transmitting information in the first transmission direction to the receiver in response to determining that the spectrum band state is idle and that the receiver lies within a coverage area of a transmitter, and transmitting the information in the first transmission direction to a first relay in response to determining that the spectrum band state is idle and that the receiver lies without the coverage area of the transmitter.

21 Claims, 10 Drawing Sheets

U.S. PATENT DOCUMENTS

| | | | |
|---|---|---|---|
| 2009/0117914 A1* | 5/2009 | Kwon et al. | 455/454 |
| 2009/0190537 A1* | 7/2009 | Hwang et al. | 370/329 |
| 2009/0225706 A1* | 9/2009 | Ramachandran et al. | 370/329 |
| 2009/0325584 A1* | 12/2009 | Pan | 455/445 |
| 2010/0166102 A1* | 7/2010 | Seyedi-Esfahani | 375/295 |
| 2010/0239039 A1* | 9/2010 | Takai et al. | 375/267 |

OTHER PUBLICATIONS

Cabric, Danijela, et al., "Implementation Issues in Spectrum Sensing for Cognitive Radios," Proc. 38$^{th}$ Asilomar Conference on Signals, Systems and Computers, 2004, pp. 772-776, Berkeley, California.

Haykin, Simon, "Cognitive Radio: Brain Empowered Wireless Communications," IEEE Journal on Selected Areas in Communications, Feb. 2005, pp. 201-220, vol. 23, No. 2.

Digham, Fadel F., "On the Energy Detection of Unknown Signals Over Fading Channels," IEEE Transactions on Communications, Jan. 2007, pp. 21-24,.vol. 55, No. 1.

Huang, Senhua, et al., "Non-Intrusive Cognitive Radio Networks based on Smart Antenna Technology," Global Telecommunications Conference, GLOBECOM '07, Nov. 2007, pp. 4862-4867, Washington, DC.

Ma, Jun, et al., "Soft Combination and Detection for Cooperative Spectrum Sensing in Cognitive Radio Networks," Global Telecommunications Conference, GLOBECOM '07, Nov. 2007, pp. 3139-3143, Washington, DC.

Ganesan, Ghurumuruhan, et al., "Cooperative Spectrum Sensing in Cognitive Radio: Part I: Two User Networks," IEEE Transactions on Wireless Communications, 2007, pp. 2204-2213, vol. 6, No. 6.

Ganesan, Ghurumuruhan, et al., "Cooperative Spectrum Sensing in Cognitive Radio: Part II: Multiuser Networks," IEEE Transactions on Wireless Communications, 2007, pp. 2214-2222, vol. 6, No. 6.

Zhang, Lan, et al., "Joint Beamforming and Power Allocation for Multiple Access Channels in Cognitive Radio Networks," IEEE Journal on Selected Areas in Communications, Jan. 2008, pp. 38-51, vol. 26, No. 1.

Federal Communications Commission, Spectrum Policy Task Force Report, ET Docket No. 02-155, Nov. 2002, 10 pages.

* cited by examiner

SYSTEM AND METHOD FOR SECONDARY COMMUNICATIONS WITH DIRECTIONAL TRANSMISSION

This application is related to the following co-assigned patent application: Ser. No. 61/077,046, filed Jun. 30, 2008, entitled "Secondary Communication with Directional Transmission," which application is hereby incorporated herein by reference.

TECHNICAL FIELD

The present invention relates generally to a system and method for wireless communications, and more particularly to a system and method for exploiting spatial spectrum holes (SSH) in the time/spectrum/location of wireless resources.

BACKGROUND

Through the use of dynamic and opportunistic spectrum access, cognitive radio (CR) enables high spectrum efficiency. The term cognitive radio was first proposed in late 1990s (see, J. Mitola and G. Q. Maquire, "Cognitive radio: making software radios more personal," IEEE Personal Communications, August 1999) and a comprehensive overview has been provided in S. Haykin, "Cognitive radio: Brain-empowered wireless communications," IEEE Journal on Selected Areas in Communications, vol. 23, No. 2, pp. 201-220, February 2005.

The basic concept of CR is to allow unlicensed CR users, also called secondary users, to use licensed spectrum bands (also referred to as licensed frequency bands) as long as they do not cause interference to licensed users, also called primary users. Therefore, CR users must be able to identify and use spectrum bands that are not being used by primary users. In practice, the available spectrum bands for CR users may vary with time and location. A region of time/spectrum/location available for a CR user is called a spectrum hole (SH). In general, a CR system may coexist with a licensed system by transmitting/receiving through SHs.

The SH is the basic resource for CR users. In a report from the Federal Communications Commission (FCC), it was shown that with a very large probability, there are always some licensed spectrum bands that are not used by primary users in a certain location or time (see, Federal Communications Commission, Spectrum Policy Task Force 1/8, an Interleaver Report, ET Docket No. 02-155, Nov. 2, 2002). So far, considerable effort has been undertaken to increase the spectrum efficiency by allowing CR users to exploit these unused bands (see, e.g., D. Cabric, S. M. Mishra, and R. W. Brodersen, "Implementation issues in spectrum sensing for cognitive radios," Proc. 38th. Asilomar Conference on Signals, Systems, and Computers, vol. 1, November 2004, pp. 772-776; F. F. Digham, M. S. Alouini, and M. K. Simon, "On the Energy Detection of Unknown Signals Over Fading Channels," IEEE Transactions on Communications, vol. 55, No. 1, pp. 21-24, January 2007; J. Ma and Y. (G.) Li, "Soft Combination and detection for cooperative spectrum sensing in cognitive radio networks," Proceedings of IEEE GLOBECOM, November 2007, pp. 3139-3143; G. Ganesan and Y. (G.) Li, "Cooperative spectrum sensing in cognitive radio—part I: two user networks," IEEE Transactions on Communications, vol. 6, No. 6, pp. 2204-2213, June 2007; "Cooperative spectrum sensing in cognitive radio—part II: multiuser networks," IEEE Transactions on Communications, vol. 6, No. 6, pp. 2214-2222, June 2007).

Spectrum sensing seeks the presence of SHs so that CR users may utilize them. While most of existing work on spectrum sensing focuses on detecting SHs in time and location, the possibility that the CR system coexists with the licensed system at the same location, time, and frequency has not been well investigated.

SUMMARY OF THE INVENTION

These and other problems are generally solved or circumvented, and technical advantages are generally achieved, by embodiments of a system and a method for exploiting spatial spectrum holes (S SH) in the time/spectrum/location of wireless resources.

In accordance with an embodiment, a method for transmitting information by a transmitter to a receiver, the transmitter having a directional antenna is provided. The method includes (1) setting the directional antenna to a first transmission direction, (2) determining a state of a spectrum band in the first transmission direction, (3) transmitting the information in the first transmission direction to the receiver in response to determining that the spectrum band state is idle and that the receiver lies within a coverage area of the transmitter, and (4) transmitting the information in the first transmission direction to a first relay in response to determining that the spectrum band state is idle and that the receiver lies without the coverage area of the transmitter.

In accordance with another embodiment, a method for relaying a transmission by a communications relay having a directional antenna is provided. The method includes determining a receiver from the transmission, and in response to determining that the communications relay is capable of relaying the transmission to the receiver, setting the directional antenna to a first transmission direction, determining spectrum band availability in the first transmission direction, relaying a corresponding transmission directly to the receiver in response to determining that the spectrum band is idle and that the receiver lies within a coverage area of the communications relay, and relaying the corresponding transmission to a second communications relay in response to determining that the spectrum band is idle and that the receiver lies without the coverage area of the communications relay. The method also includes discarding the transmission in response to determining that the communications relay is not capable of relaying the transmission to the receiver.

In accordance with another embodiment, a communications node is provided. The communications node includes a receiver coupled to an antenna, a transmitter coupled to a directional antenna, and a processor coupled to the receiver and to the transmitter. The receiver receives signals detected by the antenna, the transmitter directionally transmits signals using the directional antenna, and the processor senses a state of a spectrum band over which signals are transmitted and received, relays a received transmission to the received transmission's intended receiver or to a relay node capable of relaying the received transmission to the intended receiver, and generates a database containing transmission relaying information.

An advantage of an embodiment is that spectrum efficiency may be increased.

A further advantage of an embodiment is that interference between CR users of the CR system and primary users of the licensed system may be decreased.

Yet another advantage of an embodiment is that CR users may be logically divided into classes having differing level of priority vis-à-vis interference avoidance.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

Figure 1A:
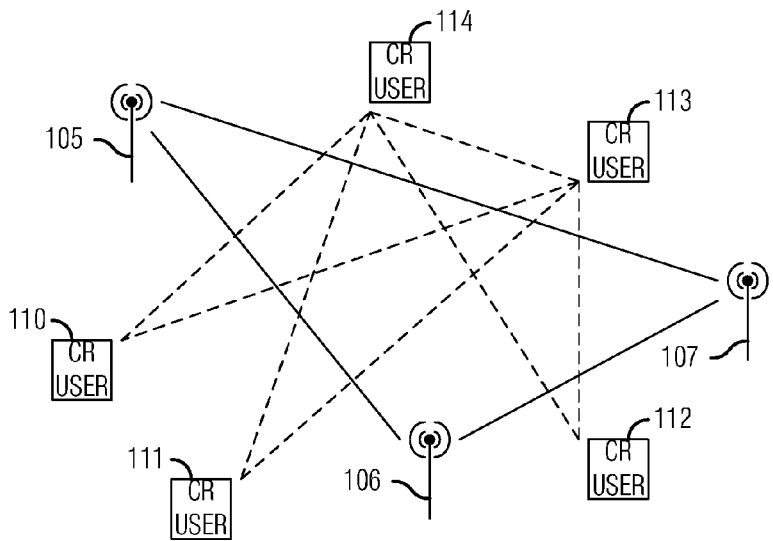
FIGS. 1a through 1c are diagrams illustrating a licensed system and a CR system operating in close proximity.

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a CR system operating in close proximity to a licensed system, wherein the CR system uses directional antennas and/or antenna arrays with beam forming. The invention may also be applied, however, to other systems wherein both a CR system and a licensed system use directional antennas and/or antenna arrays with beam forming. Furthermore, the invention may be applied to communications systems in general that use directional antennas and/or antenna arrays with a desire to increase spectral efficiency, reduce interference between devices that are not communicating with each other, or a prioritized system for logically dividing transmissions.

Generally, whether or not a spectrum hole exists at a certain time and location may be described as the presence or absence of a primary signal (a transmission of a primary user) according to an observed signal (a result of a spectrum sensing operation performed by a CR user):

$$y(t) = \begin{cases} n(t), & H_0, \\ hs(t) + n(t), & H_1, \end{cases} \quad (1)$$

where s(t) is the primary signal, h denotes the channel coefficient between a licensed user (also referred to as a primary transmitter (PT)) and a CR user, and n(t) represents additive white Gaussian noise (AWGN). Hypotheses $H_0$ and $H_1$ denote the absence and presence of the primary signal, respectively.

Typically, there may be two scenarios involved in CR communications. A first is when the CR user may access a spectrum band when the primary user is not using it temporarily, which means that both CR users and primary users may be deployed in the same spectrum band and area but using different time slots. A time slot may be a division of time wherein a primary user or a CR user may transmit. In this scenario, $H_0$ and $H_1$ in equation (1) represent that the primary user is transmitting (on) and is not transmitting (off), respectively, and the transmission of the CR user (also referred to as a secondary transmission) may be realized by utilizing silent time slots not being used by the primary user. The silent time slots may be referred to as temporal spectrum holes (TSH).

A second scenario for CR communications is that the CR user may access the spectrum band when the CR users and the primary users are in different geographic areas with path-loss and shadowing of wireless channels separating CR users and primary users, making it possible for both to transmit at the same time without interfering with each other. In this case, $H_0$ and $H_1$ in equation (1) represent whether or not the CR users and the primary users may be separated by path-loss, respectively. Transmission opportunities arising from the second scenario may be referred to as geographic spectrum holes (GSH) since the spectrum band may be reused at different locations.

FIG. 1a is a diagram illustrating a licensed system and a CR system operating in close proximity. The licensed system includes a first primary user 105, a second primary user 106, and a third primary user 107, while the CR system includes a first CR user 110, a second CR user 111, a third CR user 112, a fourth CR user 113, and a fifth CR user 114. Both the licensed system and/or the CR system may include additional users. However, the number of users shown in FIG. 1a is limited for illustrative reasons.

If the primary users (e.g., first primary user 105, second primary user 106, and third primary user 107) transmit using omni-directional antennas, then while a licensed transmission is taking place, it may be unlikely that any form of CR transmissions may take place without causing interference to the transmissions of the primary users.

However, if the CR users (e.g., first CR user 110, second CR user 111, third CR user 112, fourth CR user 113, and fifth CR user 114) transmit using directional antennas and/or an antenna array with beamforming to provide directional signal transmission and reception, the use of directional antennas and/or antenna arrays with beamforming may help to limit the propagation of a transmission, which may help reduce the interference caused by the transmissions of the CR users to the licensed users. Furthermore, if the licensed users also transmitted using directional antennas and/or antenna arrays with beamforming, then propagation of transmissions made by the licensed users to the CR users may be further reduced.

Beamforming in CR systems has been previously introduced (see, e.g., S. Huang, Z. Ding, and X. Liu, "Non-intrusive cognitive radio networks based on smart antenna technology," Proceedings of IEEE GLOBECOM, November 2007, pp. 4862-4867, and L. Zhang, Y. Liang, and Yan Xin, "Joint Beamforming and Power Allocation for Multiple Access Channels in Cognitive Radio Networks," IEEE Journal on Selected Areas of Communications, vol. 26, Issue 1, pp. 38-51, February 2008). However, rather than only considering point-to-point CR links, the preferred embodiments considers the CR system in its entirety.

As shown in FIG. 1a, the primary users may transmit to each other, for example, first primary user 105 may transmit to second primary user 106 or third primary user 107, second primary user 106 may transmit to first primary user 105 or third primary user 107, and third primary user 106 may transmit to second primary user 106 or first primary user 105. The transmissions between the primary users are shown as solid lines in FIG. 1a. Similarly, the CR users may transmit to each other, for example, first CR user 110 may transmit to fourth CR user 113 or fifth CR user 114, second CR user 111 may transmit to fourth CR user 113 or fifth CR user 114, and so on. Some of the possible transmissions between the CR users are shown as dashed lines in FIG. 1a.

In the CR system, CR users that detect an active transmission by a primary user may not transmit. However, the use of directional antennas and/or antenna arrays with beamforming may limit the impact of a transmission on devices not directly involved with either transmitting or receiving the transmission. The use of directional antennas and/or antenna arrays with beamforming may provide devices the ability to direct their transmissions. Directional transmission capability in CR users may allow them to exploit spatial spectrum holes (SSH). The ability of CR users to direct their transmissions through the use of directional antennas and/or antenna arrays with beamforming and transmission relays, the preferred embodiments may enable the licensed system and the CR system to better coexist without interference.

Figure 1B:
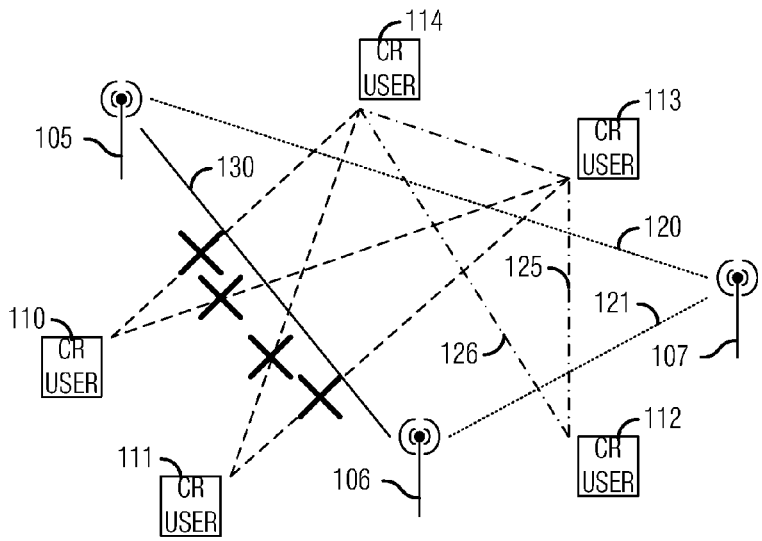

While a primary user is not transmitting, a SSH may become available for CR users. FIG. 1b is a diagram illustrating available SSH resulting from primary users not transmitting. For example, while first primary user 105 is not transmitting to third primary user 107 (shown as dashed line 120) and second primary user 106 is not transmitting to third primary user 107 (shown as dashed line 121), a SSH may become available to third CR user 112, fourth CR user 113, and fifth CR user 114 (including dash-dotted line 125 between third CR user 112 and fourth CR user 113 and dash-dotted line 126 between third CR user 112 and fifth CR user 114) if third CR user 112 does not detect the transmission between first primary user 105 and second primary user 106 (shown as solid line 130). However, because first primary user 105 is transmitting to second primary user 106, a SSH may not be available for first CR user 110 or second CR user 111.

Figure 1C:
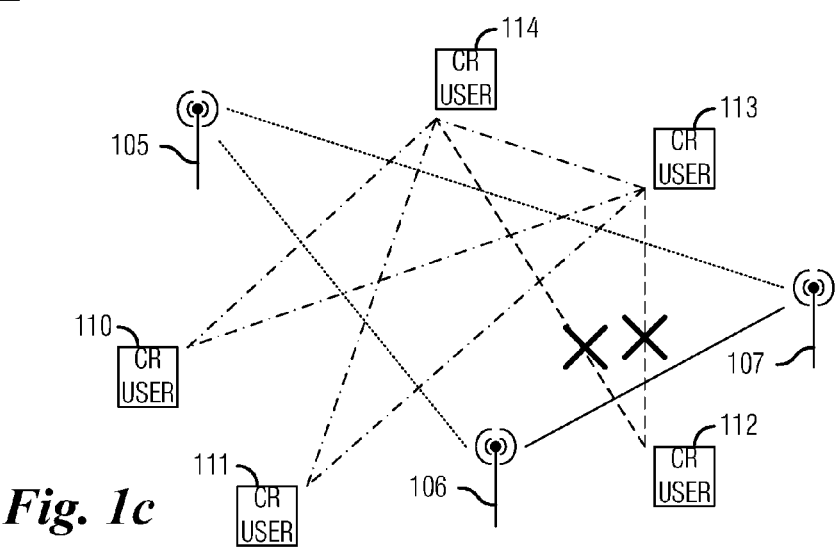

Similarly, FIG. 1c is a diagram illustrating available SSH resulting from different primary users not transmitting. As shown in FIG. 1c, first primary user 105 is not transmitting to either second primary user 106 or third primary user 107. However, second primary user 106 is transmitting to third primary user 107. Therefore, a SSH may become available to first CR user 110, second CR user 111, fourth CR user 113, and fifth CR user 114, if the CR users transmitting do not detect transmissions made between second licensed user 106 and third licensed user 107 (with possible transmissions shown as dash-dotted lines), while a SSH may not be available to third CR user 112.

Figure 2A:
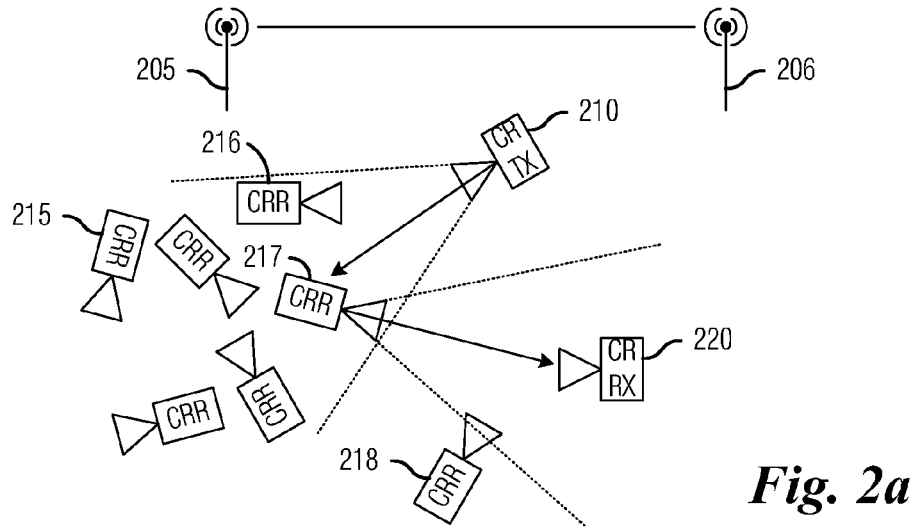
FIG. 2a is a diagram illustrating the use of a spatial spectrum hole (SSH) to facilitate communications.

FIG. 2a is a diagram illustrating the use of a SSH to facilitate communications in a portion of a licensed system and a CR system. As shown in FIG. 2a, two primary users (a first primary user 205 and a second primary user 206) may be communicating with each other. Also operating in the same general area and spectrum band may be a plurality of CR users. The CR users employ directional transmission (via directional antennas and/or antenna arrays with beamforming) and omni-directional reception. For simplicity, it is assumed that the direction of transmission for each CR user is random. However, the embodiments may also apply to situations wherein the direction of transmission for each CR user is not random, therefore, the discussion of random direction of transmission should not be construed as being limiting to either the scope or the spirit of the embodiments. Furthermore, the embodiments may also apply if the primary users employ directional transmission.

As shown in FIG. 2a, the plurality of CR users include a CR transmitter 'CR TX' 210, a number of CR relays 'CRR,' such as a CRR 215, a CRR 216, a CRR 217, and a CRR 218, and a CR receiver 'CR RX' 220. In general, a CR user may operate differently depending on requirements of a communications process. A CR user may operate as a CR transmitter, CR relay, or CR receiver. For example, it may be possible for a CR user to operate as a CR transmitter in one communications process, but then in a different communications process, the CR user may operate as a CR relay or a CR receiver. Additionally, a CR user may simultaneously operate as a CR transmitter, CR relay, and/or CR receiver.

CR TX 210 may have a transmission intended for CR RX 220. However, the direction of the transmission of CR TX 210 may not permit a direct transmission from CR TX 210 to CR RX 220. So, instead of not being able to communicate with CR RX 220, CR TX 210 may use a CR relay to serve as an intermediary and relay a transmission made to the CR relay to CR RX 220. For example, CR TX 210 may transmit a message destined for CR RX 220 to the CR relays, such as CRR 215, CRR 216, and CRR 217. Since the direction of transmission of the CR relays is random, one of the CR relays (e.g., CRR 217) may be oriented so that its direction of transmission provides coverage over CR RX 220. CRR 217 may then relay the message to CR RX 220.

In order to use a CR user as a CR relay, the CR user may need to satisfy several requirements. A first requirement is that a spectrum band in a transmission direction of the CR user must be idle and a second requirement is that the CR receiver must be within a coverage area of the CR user. If relaying is allowed to occur multiple times, a CR relay intended for use in transmission relaying must be within the coverage area of the CR user.

The CR relays upon detecting the transmission from the CR TX 210, may be able to decode that the transmission is intended for CR RX 220. The CR relays may know which CR users may be capable of receiving their transmissions through the use of a relaying database providing information regarding which CR users are capable of receiving transmissions from which CR user. Therefore, CRR 217 may be able to determine that CR RX 220 may be capable of receiving its transmission. CRR 217 may then relay (or forward) the transmission from CR TX 210 to CR RX 220. CRR 218 is outside of a coverage area of CR TX 210, so it is not capable of receiving the transmission from CR TX 210, although it may be capable of transmitting to CR RX 220.

As discussed above, a transmission from a CR transmitter, such as CR TX 210, may arrive at a CR receiver, such as CR RX 220, either directly from the CR transmitter or after it has been relayed by at least on CR relay, such as CRR 217. Although the transmission's data content may be the same for a transmission transmitted directly or relayed, the transmission's control information may be different. For example, for the directly transmitted transmission, control data may include the CR transmitter listed as originator of the transmission, while for the relayed transmission, control data may include the CR relay listed as originator of the transmission.

Figure 2B:
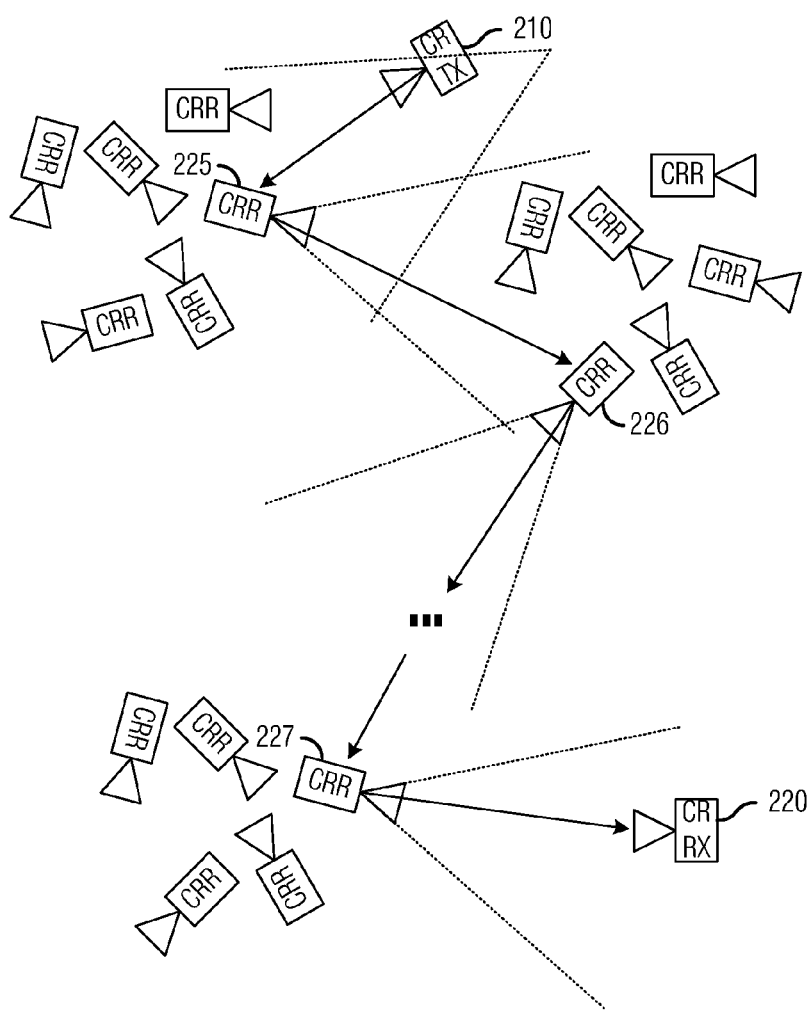
FIG. 2b is a diagram illustrating the relaying of a transmission.

The transmission from CR TX 210 to CR RX 220, as shown in FIG. 2a, is relayed by a single CR relay. It may be possible for multiple CR relays to relay a transmission from a CR transmitter to a CR receiver. FIG. 2b is a diagram illustrating the use of a SSH to facilitate communications in a portion of a licensed system and a CR system, wherein the communications may be relayed over multiple CR relays. A transmission from a CR transmitter to a CR receiver, such as from CR TX 210 to CR RX 220, may be relayed by more than one CR relay. For example, if a transmission from CR TX 210 intended for CR RX 220 is detected by a number of CR relays, but none of the CR relays may be capable of directly relaying the transmission to CR RX 220, a CR relay, such as CRR 225, may determine that it may relay the transmission to another CR relay, such as CR 226, which may result in the transmission getting closer to CR RX 220. CRR 225 may be able to determine where to relay the transmission by accessing the relaying database.

Since CRR 226 may also not be able to directly relay the transmission to CR RX 220, CRR 226 may also access the relaying database to determine another CR relay that may take the transmission closer to CR RX 220. Eventually, the transmission is relayed to CRR 227, which may be able to directly relay the transmission to CR RX 220.

The above discussion of transmission relaying focuses on a single CR user operating as a CR transmitter transmitting to another single CR user operating as a CR receiver. However, multiple CR users may share an available SSH, multiplexing their transmissions. To facilitate multiple CR users sharing an available SSH, CR transmission links may be divided into different classes based on priorities. For example, a transmission classified as class one (I) may have a higher priority than a transmission classified as class two (II) and may only need to avoid interfering with licensed transmissions. While, a transmission classified as class two (II) may need to avoid interfering with both licensed transmissions and class one (I) transmissions. In general, there may be fewer available SSH for a class two (II) transmission then for a class one (I) transmission since there are more transmissions to avoid for the class two (II) transmission. The number of classes may be extended to three (III), four (IIII), and so on. The use of classes and priorities may allow for the simultaneous use of multiple CR transmission links, which may help to further increase spectrum efficiency.

Figure 3A:
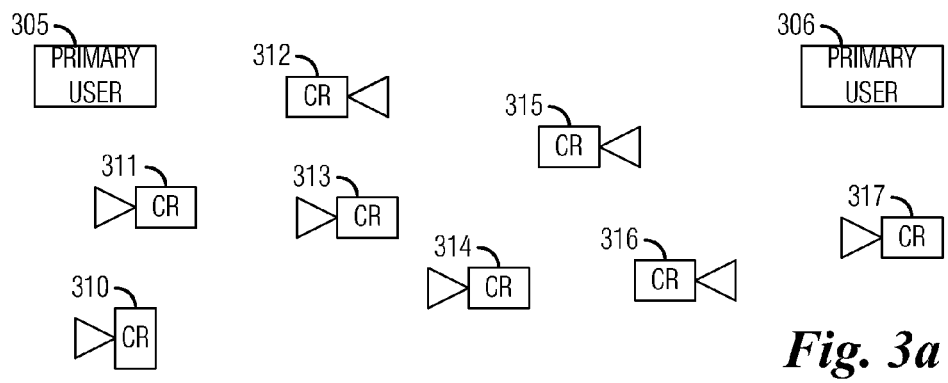
FIG. 3a is a diagram illustrating a licensed system and a CR system operating in close proximity.

FIG. 3a is a diagram illustrating a licensed system and a CR system operating in close proximity. The licensed system includes a first primary user 305 and a second primary user 306, while the CR system includes a plurality of CR users, such as CR users 310-317. Each CR user may operate as a CR transmitter, a CR receiver, or a CR relay, depending on a communications process. The CR users may utilize directional transmission to help increase spectrum efficiency. Alternatively, both the primary users and the CR users may utilize directional transmission to help increase efficiency.

Figure 3B:
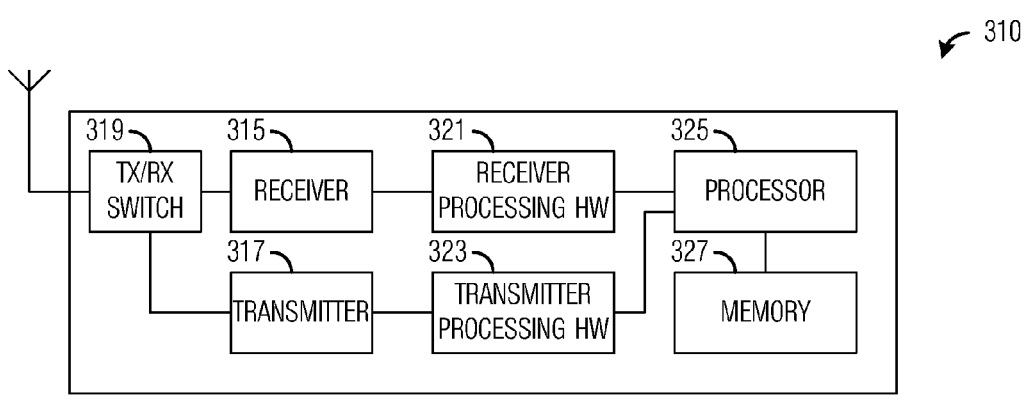
FIG. 3b is a diagram illustrating a CR user.

FIG. 3b is a diagram illustrating a CR user, such as CR user 3 10. CR user 310 includes a receiver 315 and a transmitter 317 for use in receiving signals and transmitting signals. Depending on configuration, a transmit/receive (TX/RX) switch 319 may allow for the receiver 315 and the transmitter 317 to share an antenna. Alternatively, the receiver 315 and the transmitter 317 may have dedicated receive and transmit antennas.

CR user 310 also includes receiver processing hardware 321 that may be used for processing received signals, including filtering, decoding, error detecting and correcting, amplifying, digitizing, mixing, and so forth. CR user 310 also includes transmitter processing hardware 323 that may be used for processing signals to be transmitted, including filtering, encoding, mixing, amplifying, and so on. Output of receiver processing hardware 321, such as data, may be provided to a processor 325. Processor 325 may be used to perform computations using the output of receiver processing hardware 321. A memory 327 may be used to store data, applications, programs, configuration information, and so forth.

Figure 3C:
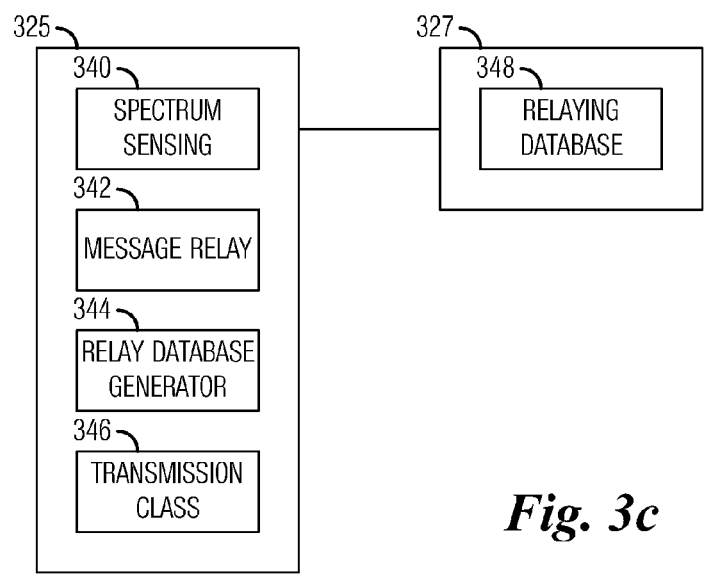
FIG. 3c is a diagram illustrating a detailed view of a processor and a memory.

FIG. 3c is a diagram illustrating a detailed view of processor 325 and memory 327. Processor 325 includes a spectrum sensing unit 340. Spectrum sensing unit 340 may be used to sense a received energy within a specified spectrum band. Then, from the received energy, it may be determined if a transmission is taking place. Spectrum sensing unit 340 may sense the received energy by filtering a received signal to help eliminate or reduce signals outside of the specified spectrum band, measure a received energy within the specified spectrum band, accumulate the received energy for a specified amount of time, and then based on the accumulated received energy, decide if a transmission is taking place in the specified spectrum band.

Processor 325 also includes a message relay unit 342. Message relay unit 342 may detect a received transmission to determine the received transmission's intended destination. Message relay unit 342 may access a relaying database 348 stored in memory 327 to determine if the intended destination of the received transmission is reachable by a transmission made by CR user 3 10. If the intended destination is not reachable, then message relay unit 342 may discard the received transmission. If the intended destination is reachable, then message relay unit 342 may provide the received transmission to transmitter processing hardware 323 so that the received transmission may be relayed.

Processor 325 also includes a relay database generator 344. Relay database generator 344 may be used to generate relaying database 348. For example, periodically, relay data generator 344 may cause CR user 310 to transmit a special message that requests all receivers of the special message (such as a response requested message) to respond. Relay database generator 344 may then save identification information for each responder in relaying database 348. If multiple transmission relaying steps are to be used, relay database generator 344 may transmit another message (such as a relaying database requested message) to the responders requesting them to provide their relaying database to CR 310. Relay database generator 344 may repeat transmitting the relay database requested message for as many levels of transmission relaying as permitted in the CR system.

Relay database generator 344 may be configured to periodically generate relaying database 348. Alternatively, relay database generator 344 may generate relaying database 348 when a performance metric reaches a specified threshold. For example, if a metric measuring undelivered transmissions reaches a specified threshold, transmission wait times, transmission failures, etc., then relay database generator 344 may initiate a generating of relaying database 348.

The processor 325 also includes a transmission class unit 346. Transmission class unit 346 may be used to control transmissions based on a transmission's classification. For example, a transmission may not be allowed to occur if the spectrum band is already being used by a transmission having a class representing a higher priority. However, if the spectrum band is being used by a transmission having a class representing a lower priority, then the transmission may be allowed to occur. Licensed transmissions have the highest priority, while transmissions made by CR users may have a range of priorities, all lower than that of licensed transmission. Assigning a class to transmissions may allow for a better utilization of the spectrum band, yielding a higher spectral efficiency.

Figure 4:
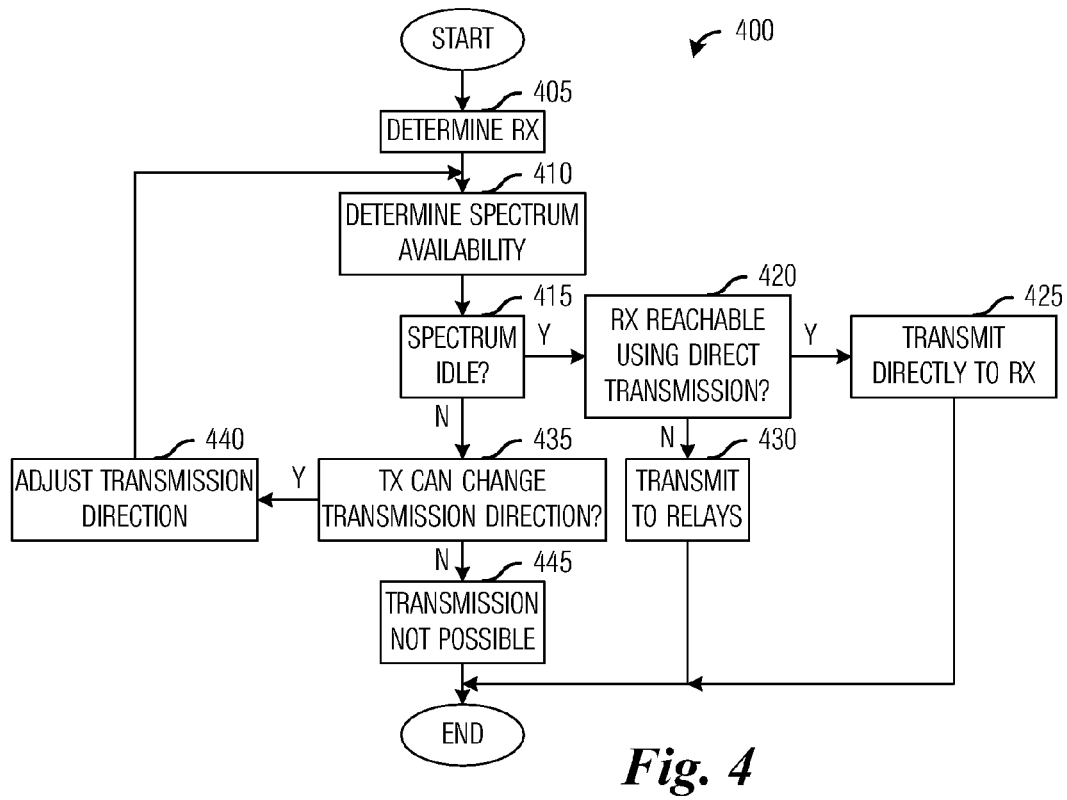
FIG. 4 is a flow diagram illustrating a sequence of events in transmitting information at a CR transmitter.

FIG. 4 is a flow diagram illustrating a sequence of events 400 in transmitting information at a CR transmitter. The sequence of events 400 may be descriptive of events taking place at a CR transmitter each time the CR transmitter has information to transmit. The transmitting of information at a CR transmitter may begin with a CR transmitter, such as CR TX 210, determining a CR receiver, such as CR RX 220, for its transmission (block 405). After determining the CR receiver, the CR transmitter may determine availability of the spectrum band (block 410). The CR transmitter may determine spectrum band availability by examining established spectrum band usage restrictions (for example, permissible transmission times, allowable transmission classes, allowable CR users, and so forth), or the CR transmitter may sense the spectrum band for a transmission.

If the spectrum band is idle, i.e., the spectrum band is not being used for a transmission (block 415), then the CR transmitter may check to determine if the CR receiver is within a coverage area of the CR transmitter (block 420). If the CR receiver is within the coverage area of the CR transmitter, then the CR transmitter may directly transmit to the CR receiver (block 425). If the CR receiver is not within the coverage area of the CR transmitter, then the CR transmitter may still be able to transmit to the CR receiver, however, the CR transmitter may need to transmit to CR relays, which may then relay the transmission to the CR receiver (block 430). After the CR transmitter transmits to either the CR receiver (block 425) or the CR relays (block 430), the transmitting of information at the CR transmitter may terminate.

If the spectrum band is not idle (block 415), then the CR transmitter may change its transmission direction. If the CR transmitter is capable of changing transmission direction (block 435), then the transmission direction of the CR transmitter may be adjusted (block 440). For example, the transmission direction may be adjusted by changing to a different directional antenna or an antenna array may use a different set of beamforming coefficients. After the transmission direction of the CR transmitter has been adjusted, the transmitting of information may retry by returning to block 410 to determine spectrum availability.

If transmission classes are used to allow multiple CR users to share an available SSH, then the spectrum band may not be idle (block 415), but if a transmission on the spectrum band is of a lower transmission class than the transmission that the CR transmitter is attempting to transmit, then the transmission already on the spectrum band may be preempted by the CR transmitter. If this is the case, then the CR transmitter may check to determine if the CR receiver is within a coverage area of the CR transmitter (block 420). If the CR receiver is within the coverage area of the CR transmitter, then the CR transmitter may directly transmit to the CR receiver (block 425). If the CR receiver is not within the coverage area of the CR transmitter, then the CR transmitter may still be able to transmit to the CR receiver, however, the CR transmitter may need to transmit to CR relays, which may then relay the transmission to the CR receiver (block 430). If the CR transmitter is transmitting the transmission to the CR relays rather than the CR receiver, then control information of the transmission using relays may be different from control information of the transmission directly transmitted, but the data content may remain the same. After the CR transmitter transmits to either the CR receiver (block 425) or the CR relays (block 430), the transmitting of information at the CR transmitter may terminate.

If the CR transmitter's transmission direction may not be adjusted or if all of the possible transmission directions have already been tried, then a transmission may not be possible (block 445). The spectrum band's busy status may be temporary and the transmission may be queued so that the transmission may be attempted again at a later time. Alternatively, if the transmission is time critical, the transmission may not be able to wait for a later time, so the transmission may be discarded and the CR transmitter notified. In either case, the transmitting of information may terminate.

Figure 5:
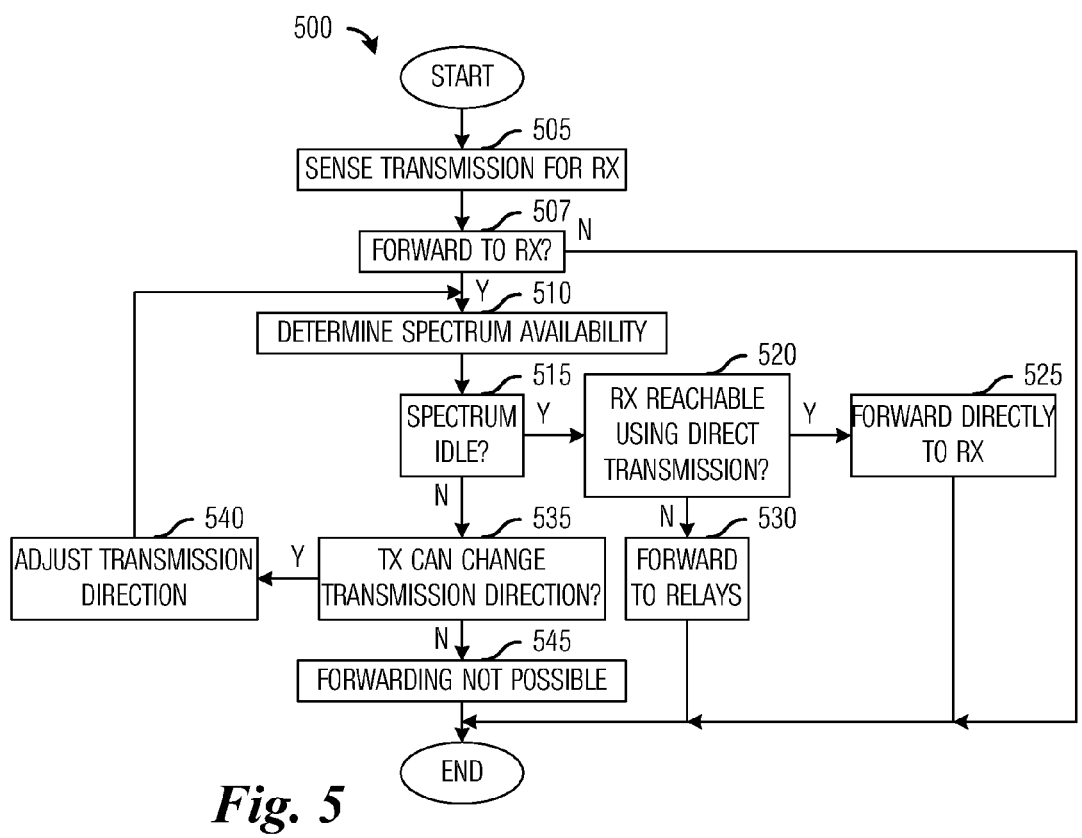
FIG. 5 is a flow diagram illustrating a sequence of events in relaying information at a CR relay.

FIG. 5 is a flow diagram illustrating a sequence of events 500 in relaying information at a CR relay. The sequence of events 500 may be descriptive of events taking place at a CR relay each time the CR relay senses a transmission. The relaying of information at a CR relay may begin with a CR relay, such as CRR 217, sensing a CR receiver, such as CR RX 220, for a transmission (block 505). After sensing the CR receiver. The CR relay may determine if it is capable of relaying the information to the CR receiver (block 507). The CR relay may determine if it is capable of relaying the information to the CR receiver by accessing a relaying database. If the CR receiver is in the relaying database or another CR relay that may relay the transmission to the CR receiver is in the relaying database then the CR relay may be capable of relaying the information to the CR receiver. If the CR relay is not capable of relaying the information to the CR receiver, then the relaying of information at a CR relay may terminate.

If the CR relay is capable of relaying the information to the CR receiver, then the CR relay may determine availability of the spectrum band (block 510). The CR relay may determine spectrum band availability by examining established spectrum band usage restrictions, or the CR relay may sense the spectrum band for a transmission.

If the spectrum band is idle, i.e., the spectrum band is not being used for a transmission (block 515), then the CR relay may check to determine if the CR receiver is within a coverage area of the CR relay (block 520). The CR relay may do so by accessing its relaying database. If the CR receiver is within the coverage area of the CR relay, then the CR relay may directly transmit to the CR receiver (block 525). If the CR receiver is not within the coverage area of the CR transmitter, then the CR relay may still be able to transmit to the CR receiver, however, the CR relay may need to transmit to intermediate CR relays, which may then relay the transmission to the CR receiver (block 530). If the CR relay is transmitting the transmission to an intermediate CR relay rather than the CR receiver, then control information of the transmission to intermediate CR relays may be different from control information of the transmission directly transmitted, but the data content may remain the same. After the CR relay transmits to either the CR receiver (block 525) or the CR relays (block 530), the relaying of information at the CR relay may terminate.

If the spectrum band is not idle (block 515), then the CR relay may change its transmission direction. If the CR relay is capable of changing transmission direction (block 535), then the transmission direction of the CR relay may be adjusted (block 540). For example, the transmission direction may be adjusted by changing to a different directional antenna or an antenna array may use a different set of beamforming coefficients. After the transmission direction of the CR relay has been adjusted, the relaying of information may retry by returning to block 510 to determine spectrum availability.

As discussed previously, if transmission classes are use to allow multiple CR users to share an available SSH, then the spectrum band may not be idle (block 415), but if a transmission on the spectrum band is of a lower transmission class than the transmission that the CR relay is attempting to relay, then the transmission already on the spectrum band may be preempted by the CR relay.

If the CR relay's transmission direction may not be adjusted or if all of the possible transmission directions have been tried, then a transmission may not be possible (block 545). The spectrum band's busy status may be temporary and the transmission may be queued so that the transmission may be attempted once again at a later time. Alternatively, if the transmission is time critical, the transmission may not be able to wait for a later time, so the transmission may be discarded and the CR relay and a CR transmitter that originated the transmission may be notified. In either case, the relaying of information may terminate.

Figures 6A, 6B:
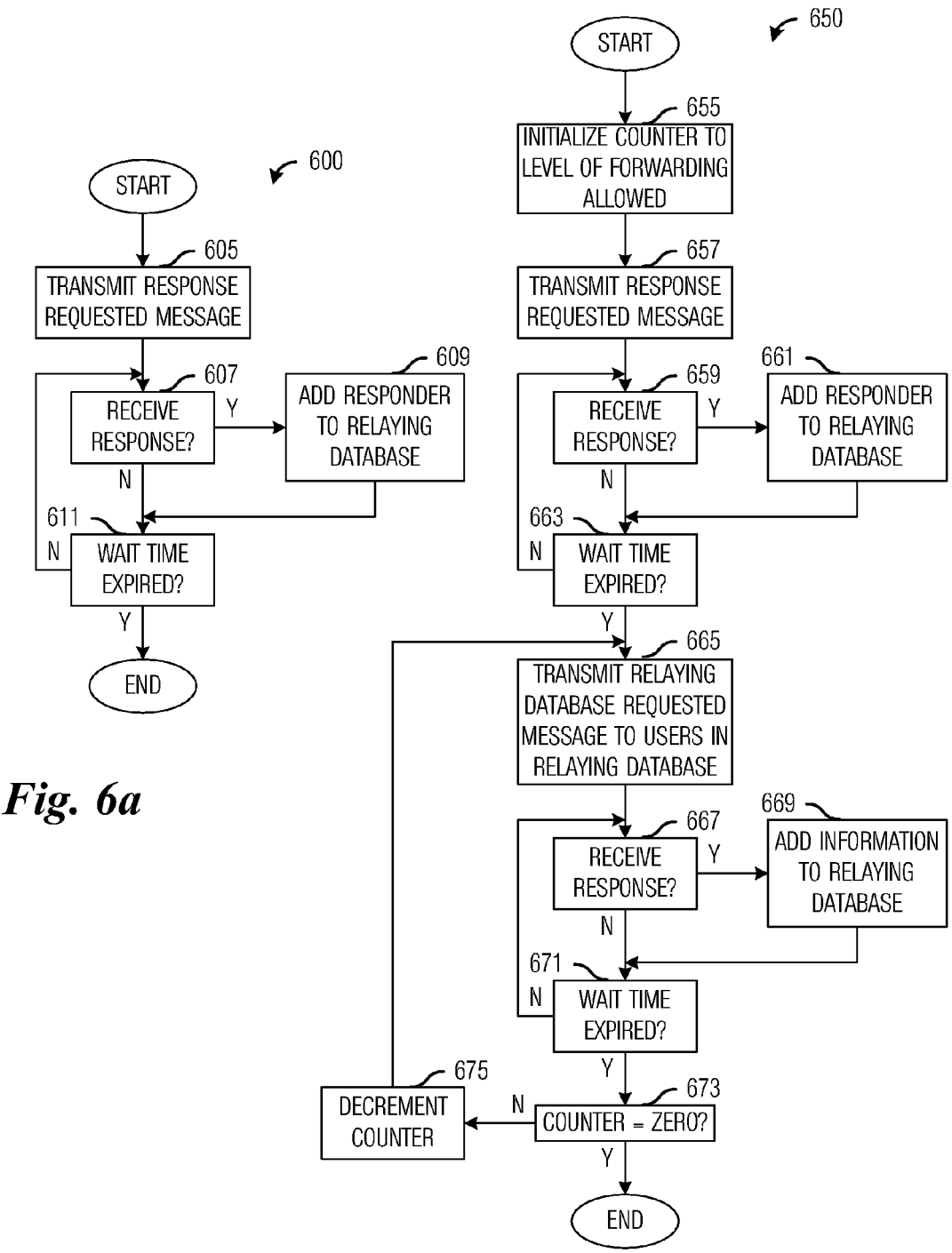
FIG. 6a is a flow diagram illustrating a sequence of events in the generation of a relaying database.
FIG. 6b is a flow diagram illustrating a sequence of events in the generation of a relaying database.

FIG. 6a is a flow diagram illustrating a sequence of events 600 in the generation of a relaying database. The generation of a relaying database may take place in a CR user and may occur periodically or when a specified event, such as a metric meets or exceeds a specified value. The generation of a relaying database may begin with a transmission of a message, such as a response requested message by the CR user generating the relaying database (block 605). The CR user may then wait for responses to the message. When the CR user receives a response (block 607), the CR user may add identifying information about an originator of the response into the relaying database (block 609). After the CR user has updated the relaying database with information about the responder, the CR user may check to determine if a specified wait time for responses has expired (block 611). If the specified wait time has not expired, then the CR user may return to block 607 for additional responses. If the specified wait time has expired, then the generation of the relaying database may terminate.

FIG. 6b is a flow diagram illustrating a sequence of events 650 in the generation of a relaying database, wherein a transmission may be relayed multiple times to a destination. The generation of a relaying database may take place in a CR user and may occur periodically or when a specified event, such as a metric meets or exceeds a specified value. The generation of a relaying database may begin with an initialization of a counter to a value equal to a maximum allowed number of times that a transmission may be relayed (block 655). The generation of a relaying database may continue with a transmission of a message, such as a response requested message by the CR user generating the relaying database (block 657). The CR user may then wait for responses to the message. When the CR user receives a response (block 659), the CR user may add identifying information about an originator of the response into the relaying database (block 661). After the CR user has updated the relaying database with information about the responder, the CR user may check to determine if a specified wait time for responses has expired (block 663). If the specified wait time has not expired, then the CR user may return to block 659 for additional responses.

If the specified wait time has expired, then the CR user may transmit a second message to CR users listed in the relaying database (block 665). The second message may be a request to the CR users to transmit their relaying databases to the source of the second message. The CR user may then wait for responses to the second message. When the CR user receives a response (block 667), the CR user may add the contents of the received relaying database to its own relaying database (block 669). After the CR user has updated the relaying database with the received relaying database, the CR user may check to determine if a specified wait time for responses has expired (block 671). If the specified wait time has not expired, then the CR user may return to block 659 for additional responses.

If the specified wait time has expired, then the CR user may check to determine if the counter is equal to zero (block 673). If the counter is equal to zero, then the CR user has traversed as many transmission hops away from itself as the permitted number of times that a transmission may be relayed. If the counter is not equal to zero (block 673), then the counter may be decremented and the generation of the relaying database may return to block 665 to repeat the transmission of the second message to members of the relaying database. If the counter is equal to zero, then the relaying database has been updated and the generation of the relaying database may terminate.

In an alternative embodiment, the CR user may transmit a message requesting a response from all recipients. When a receiving CR user receives the message, the receiving CR user may transmit a response back to the CR user. In addition, the receiving CR user may transmit its own message requesting a response from all recipients. Then, when the receiving CR user receives a response from its message, the receiving CR user may provide the response to the CR user. The messages may include a counter that counts a number of hops away from the CR user. When the counter is equal to the permitted number of times that a transmission may be relayed, the transmission of the message may stop.

In the following paragraphs, the instantaneous successful communication probability (SCP) from a CR transmitter to a CR receiver will be analyzed. Then, the SCP within multiple consecutive time slots will be investigated. Also, the multiplexing transmissions by multiple CR transmitters in a CR system will be considered. For simplicity, ideal spectrum sensing and data transmission are assumed throughout this section.

Herein, the discussion's focus is placed on CR transmitters having directional antennas. However, the discussion may be readily applied to CR transmitters having antenna arrays with beamforming. Therefore, the discussion of directional antennas should not be construed as being limiting to either the scope or the spirit of the embodiments.

Let a directional antenna's aperture be expressed as θ in degrees and a normalized antenna aperture be expressed as $$\gamma = \frac{\theta}{360}.$$

Suppose that there are L primary users and N CR users in a certain area with their locations being independent random variables with a uniform distribution in the given area.

For direct transmission (a transmission direct from a CR transmitter to a CR receiver without transmission relaying): A probability that a spectrum sensing result is idle for the CR transmitter is expressible as:

$$P_{CR\ transmitter,idle} = (1-\gamma) \quad (2)$$

At the same time, a probability that the CR receiver falls in a coverage area of the CR transmitter is $\gamma$. Therefore, a probability of a one-hop transmission (a direct transmission) between the CR transmitter and the CR receiver is expressible as:

$$P_1 = \gamma(1\gamma)) \quad (3)$$

For a two-hop transmission (a transmission from a CR transmitter to a CR receiver with a single intermediate CR relay): When a two-hop communication between the CR transmitter and the CR receiver is considered, a CR relay needs to be selected to relay the transmission. Suppose that there are n CR users in the coverage area of the CR transmitter. Since n is a random variable with binomial distribution, its probability mass function (PMF) is expressible as:

$$f(n) = \binom{N}{n} \gamma^n (1-\gamma)^{N-n},\ 0 \le n \le N, \quad (4)$$

where $$\binom{N}{n} = \frac{N!}{n!(N-n)!}$$

and '!' denotes a factorial operation. For each of the n CR users in the coverage area of the CR transmitter (according to the above discussed requirements for being a CR relay), a probability that a CR user qualifies as a CR relay is $\gamma(1-\gamma)^L$. Therefore, given n, a probability that there exists at least one CR relay is expressible as:

$$P_{CR\ relay,n} = 1 - [1-\gamma(1-\gamma)^L]^n. \quad (5)$$

If $A = 1 - \gamma(1-\gamma)^L$, then a mean value of $P_{CR\ relay,n}$ may be obtained by:

$$P_{CR\ relay} = E\{P_{CR\ relay,n}\} = 1 - E\{A^n\} = 1 - E\{e^{n\ln A}\}, \quad (6)$$

where $E\{\cdot\}$ is an expectation operation. Recall that the moment-generating function of the binomial random variable n is expressible as:

$$M_n(t) = E\{e^{nt}\} = (1-\gamma+\gamma e^t)^N. \quad (7)$$

According to equations (6) and (7), the mean value of $P_{CR\ relay,n}$ is expressible as:

$$P_{CR\ relay} = E\{P_{CR\ relay,n}\} = 1 - (1-\gamma+\gamma A)^N. \quad (8)$$

Therefore, the average SCP of a two-hop transmission is expressible as:

$$P_2 = P_{CR\ transmitter,idle} \cdot P_{CR\ relay} = (1-\gamma)^L [1-(1-\gamma+\gamma A)^N]. \quad (9)$$

Although it is feasible to realize secondary transmissions between the CR transmitter and the CR receiver through relaying the transmission multiple times, concern may be given to overhead and complexity. Therefore, only directional transmissions (one-hop) and single relaying transmissions (two-hop) are considered.

According to the above, the SCP of a two-hop transmission is expressible as:

$$Q_2 = \bigcup_{m=1}^{2} P_m = 1 - \prod_{m=1}^{2} (1 - P_m) \quad (10)$$
$$= 1 - [1 - \gamma(1-\gamma)^L] \times \{1 - (1-\gamma)^L[1-(1-\gamma+\gamma A)^N]\},$$

where $\cup$ is the union operator.

In the above discussion, an assumption was made that the transmission direction of CR users were fixed and the instantaneous SCP with a single time slot was investigated. In the following discussion, the SCP between the CR transmitter and the CR receiver in multiple consecutive time slots will be investigated. In order to facilitate analysis, an assumption that the transmission direction of a transmission made by a CR user varies independently from time slot to time slot, which may be a result of the CR user's random movements or by different beam pattern vectors used in different time slots. Let v be a time slot index, P as the SCP in each time slot, then an overall SCP within V consecutive time slots may be expressed as:

$$P_V = \bigcap_{v=1}^{V} P = 1 - (1-P)^V, \quad (11)$$

where $\cap$ is the intersection operator. A higher SCP may be achieved by letting CR users attempt to communications in more time slots.

In order to analyze spectrum multiplexing among CR users, first assume that there is a licensed system and a CR system coexisting in a same general area with both systems using the same spectrum band and bandwidth W at a time period T. Therefore, a time-bandwidth product is M=TW, which may represent an available time-frequency resource (TFR). Let there be L' primary users and N' CR users operating in the area. If only one CR transmission link coexists with the licensed transmission links, the CR transmission link may be assigned as a class one (I) link. For the CR transmission link in class one (I), the SCP of a $m_1$-hop transmission link may be calculated from equations (3) or (9) as $P_{m_1}^{(1)}$ (L=L', N=N'), where $1 \le m_1 \le 2$ and an upper index of P represents the class of the CR transmission link.

For the CR transmission link assigned as a class two (II) link, CR transmission links assigned as class one (I) links may be treated as equivalent to a licensed transmission link to avoid interference. Therefore, the SCP of a $m_2$-hop transmission link in class (II) may be expressed as:

$$P_{m_2}^{(2)} = \bigcup_{m_1=1}^{M} P_{m_2}^{(2)} (L' = L + m_1, n = N' - m_1), \quad (12)$$

where $1 \le m_2 \le M$ and M=2. Similarly, the SCP of a $m_k$-hop link in class (k) may be expressed as:

$$P_{m_k}^{(k)} = \bigcup_{m_{k-1}=1}^{M} \bigcup_{m_{k-2}=1}^{M} \ldots \bigcup_{m_1=1}^{M} P_{m_k}^k \binom{L = L' + m_{k-1} + m_{k-2} + \ldots + m_1,}{N = N' - m_{k-1} - m_{k-2} - \ldots - m_1}. \quad (13)$$

Furthermore, the TFR of the $m_k$-hop link in class (k) with a maximum of M hops is expressible as:

$$M_k = M \bigcup_{m_k=1}^{M} P_{m_k}^{(k)} = M Q_M^{(k)}, \quad (14)$$

where $$Q_M^{(k)} = 1 - \prod_{k=1}^{K} \left(1 - P_{m_k}^{(k)}\right).$$

Therefore, an overall TFR for the CR system is expressible as:

$$M_{CR} = \sum_{k=1}^{K} M_k = M \sum_{k=1}^{K} Q_M^{(k)}, \quad (15)$$

where K is a number of active CR transmission links. Then an equivalent reuse ratio of the TFR for the CR system may be expressed as:

$$\eta = \frac{M_{CR}}{M} = \sum_{k=1}^{K} Q_M^{(k)}, \quad (16)$$

which is determined by the density of the primary users and the CR users, the directional antenna aperture of a CR user, a maximum number of times that a transmission may be relayed, and so forth.

Simulation studies have been performed to measure the performance of transmitting information in a CR system using transmission relaying. Assumptions used in the simulation studies include: a licensed system and a CR system deployed in the same area, and that a number of CR users (N) is much larger than a number of primary users (L).

Figure 7:
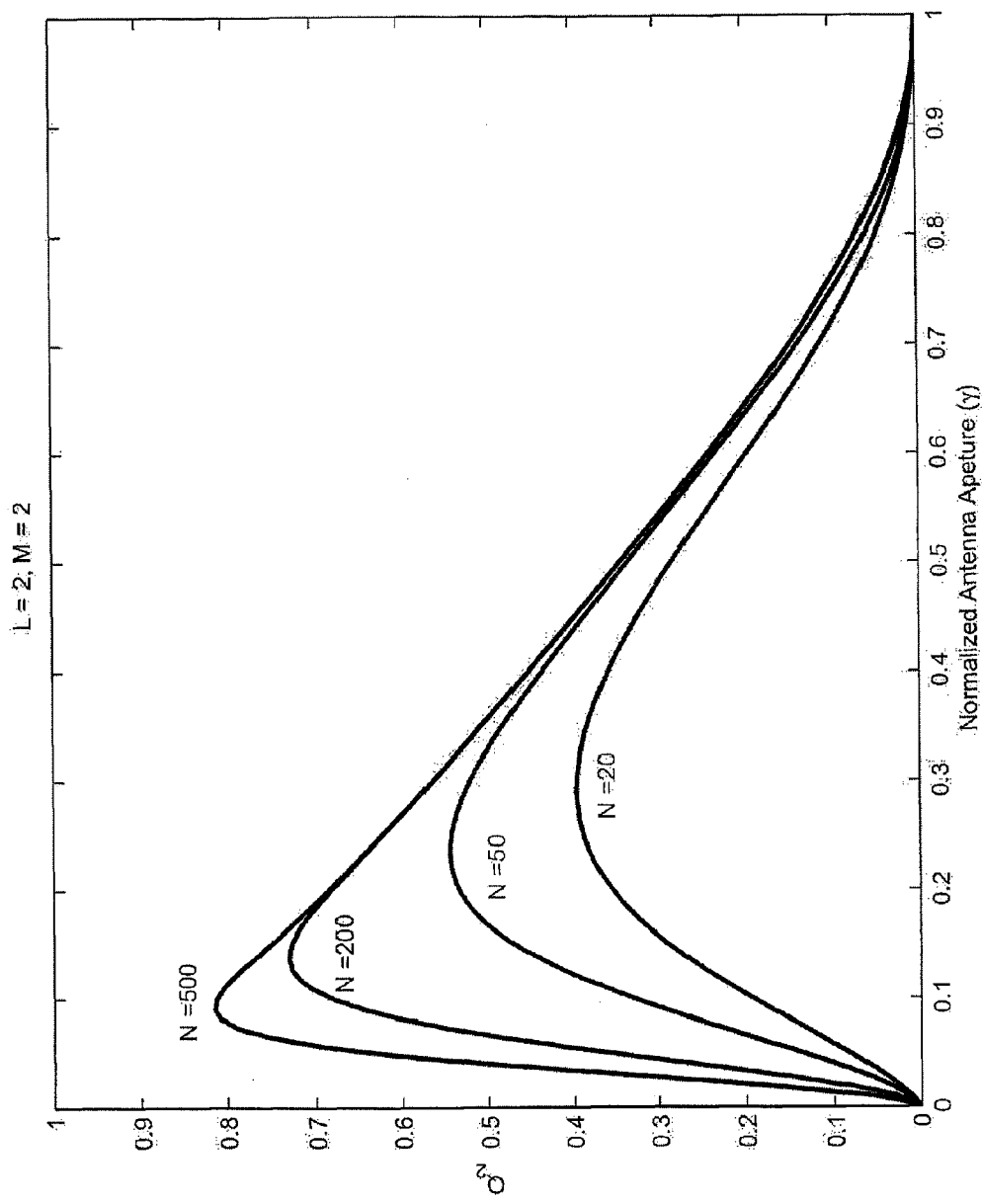
FIG. 7 is a data plot illustrating the CR system's SCP, $Q_2$, versus normalized antenna aperture $\gamma$ for different values of N.

FIG. 7 is a data plot illustrating the CR system's SCP, $Q_2$, versus normalized antenna aperture γ for different values of N, with L=2 and M=2, i.e., there are two primary users communicating and transmissions in the CR system may allow a single relaying by a CR relay. As shown in FIG. 3, the maximum $Q_2$ increases with the number of CR users. This may be predicted since more CR users may mean that a more thorough exploitation of available SSH. Furthermore, with larger numbers of CR users, the smaller the optimum value for normalized antenna aperture γ. This is again expected since with more CR users, a CR transmitter may more readily find a viable CR relay. Additionally, with larger numbers of CR users, interference from the primary users may become the bottleneck for SCP. With a smaller antenna aperture, interference from the primary users may be reduced. However, with smaller numbers of CR users, a lack of available CR relays may be the bottleneck for SCP, and a larger antenna aperture may help to alleviate this by helping a CR transmitter find a CR relay more readily.

Figure 8:
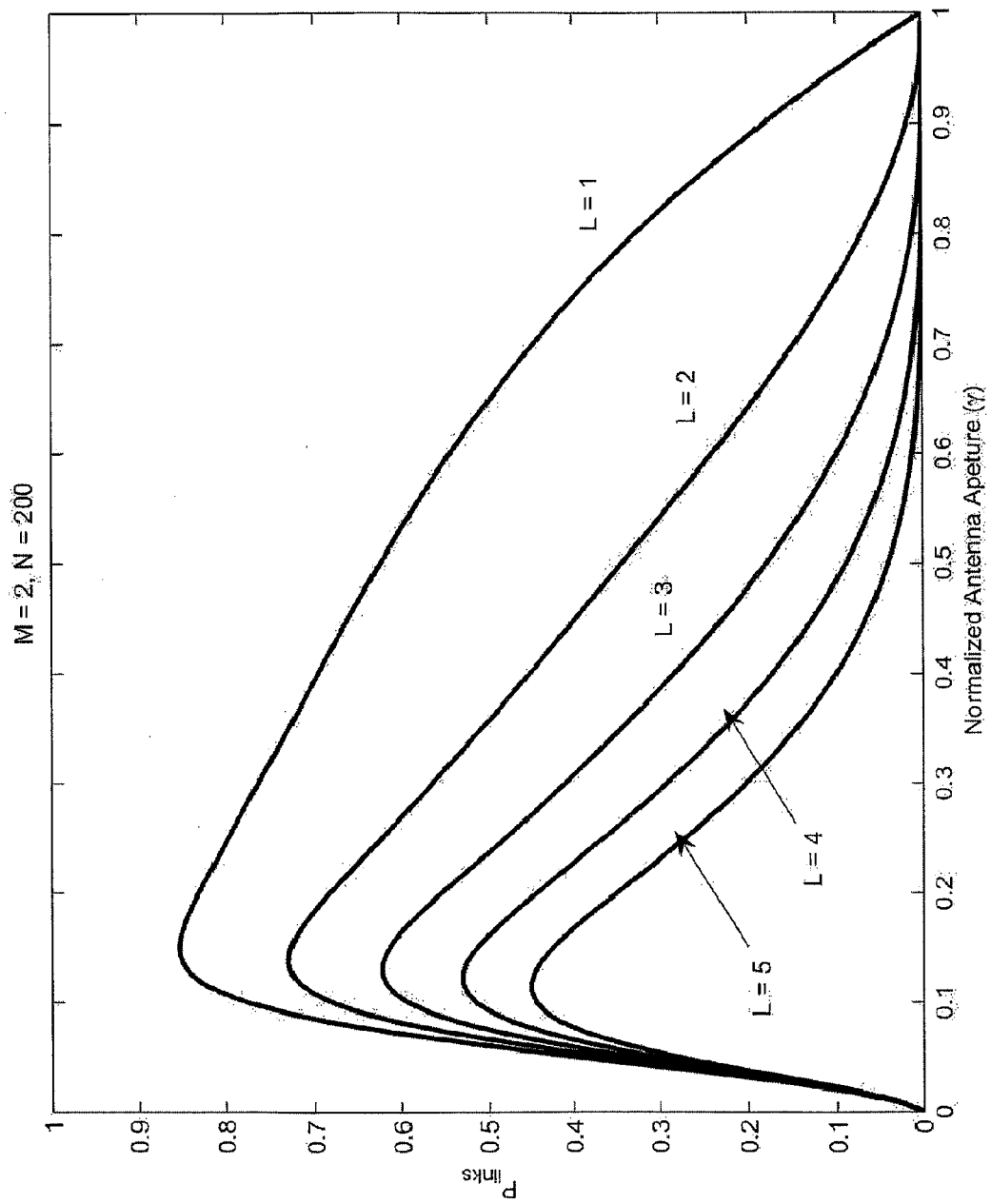
FIG. 8 is a data plot illustrating SCP versus normalized antenna aperture $\gamma$ for different values of L.

FIG. 8 is a data plot illustrating SCP versus normalized antenna aperture γ for different values of L, with M=2 and N=200. As shown in FIG. 8, as the maximum number of primary users (L) increases, both the maximum $Q_2$ and corresponding optimal antenna aperture decreases. This may be due to decreased SSH as the number of primary users increase, thereby decreasing antenna aperture may be needed to reduce interference to primary users.

Figure 9:
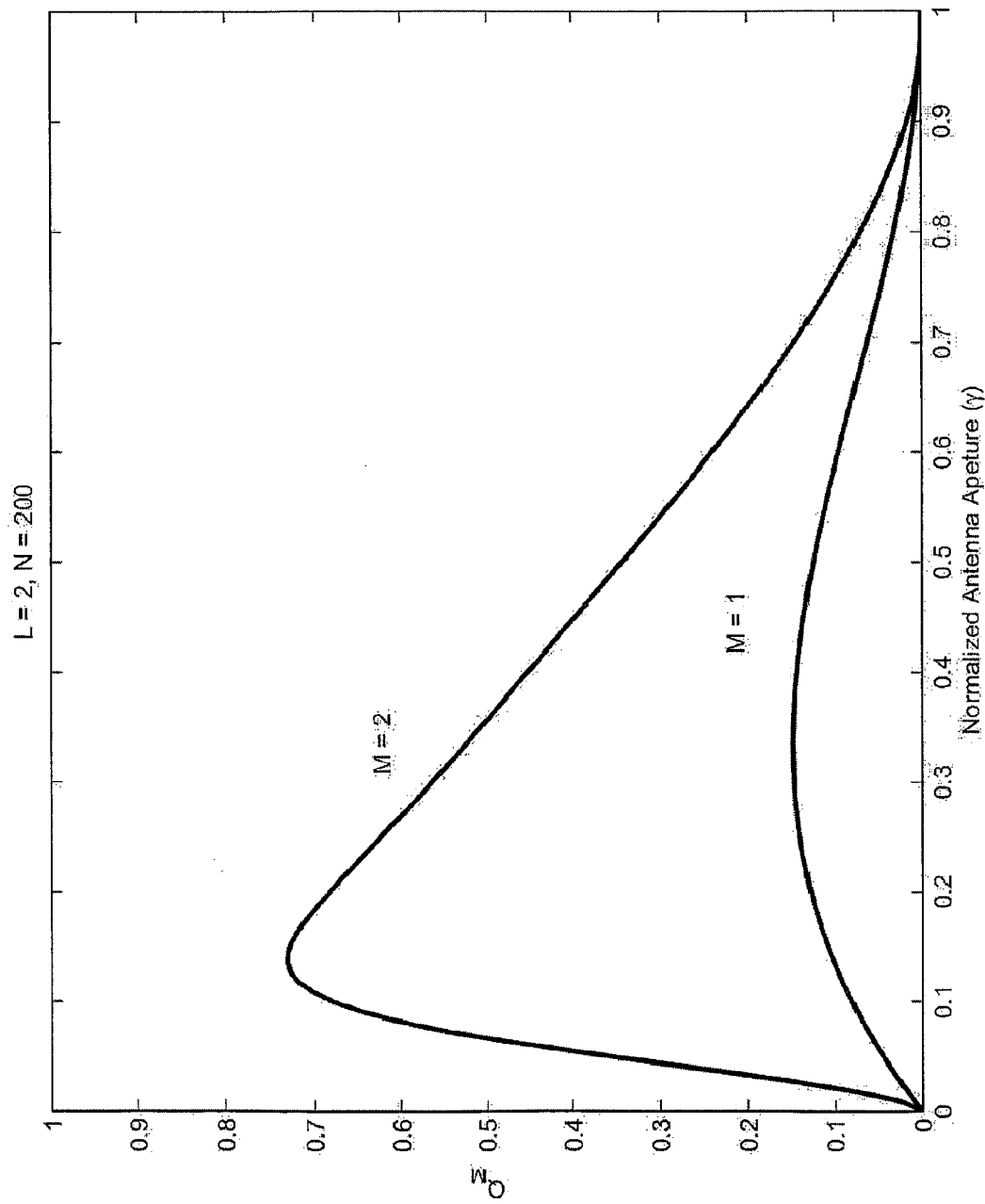
FIG. 9 is a data plot illustrating SCP versus normalized antenna aperture $\gamma$ for different values of M.

FIG. 9 is a data plot illustrating SCP versus normalized antenna aperture γ for different values of M, with L=2 and N=200. As shown in FIG. 9, $Q_M$ may dramatically increase as M changes from 1 to 2, indicating that the use of transmission relaying may greatly improve CR system performance.

Figure 10:
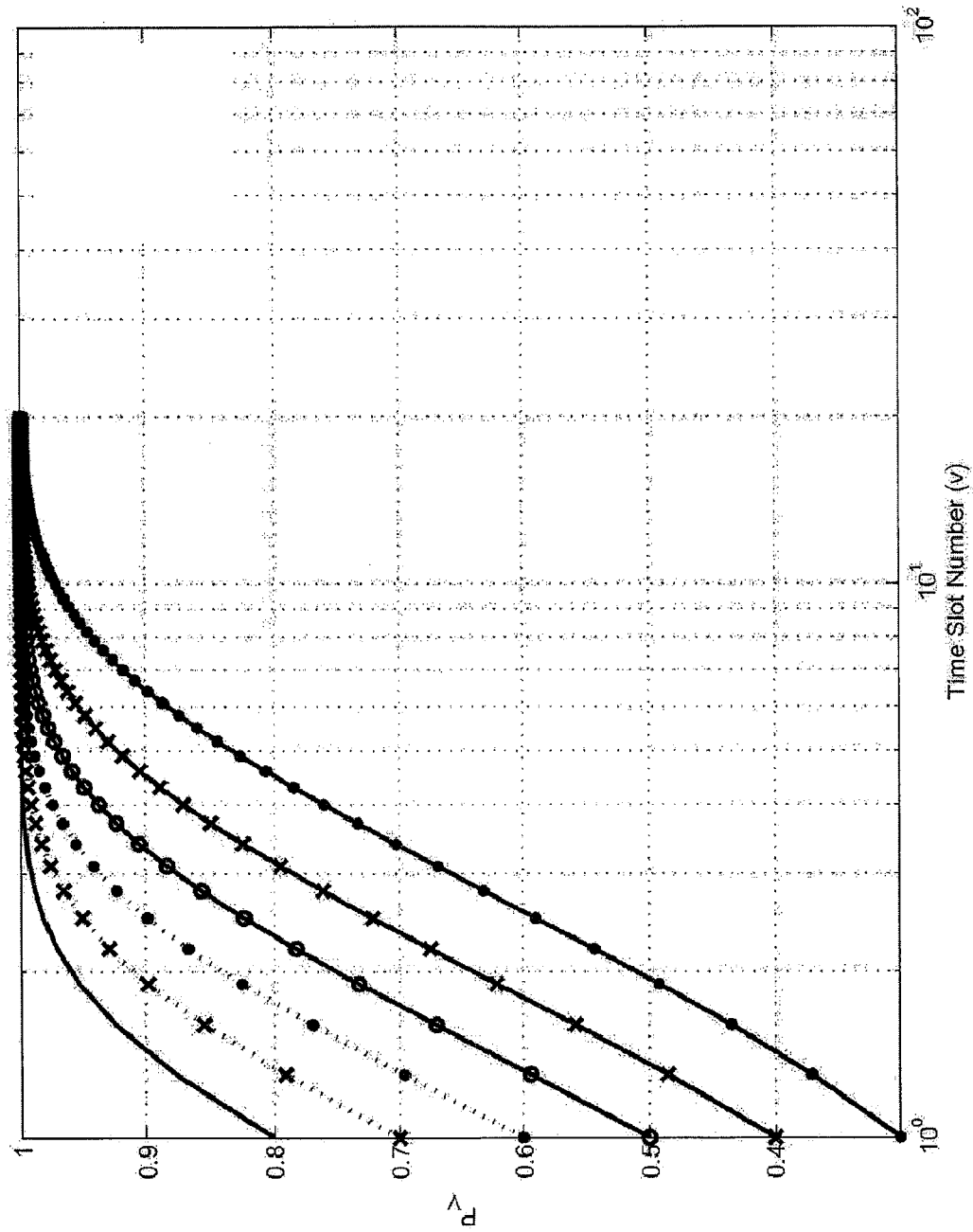
FIG. 10 is a data plot illustrating SCP versus time slot number for different values of spectrum band idle probabilities.

FIG. 10 is a data plot illustrating SCP versus time slot number for different values of spectrum band idle probabilities. An assumption that a CR user's antenna direction changes independently from time slot to time slot. As shown in FIG. 10, the SCP increases dramatically as time goes by, indicating that a successful second communications attempt may be guaranteed only if a CR transmitter attempts to transmit continually.

Figure 11:
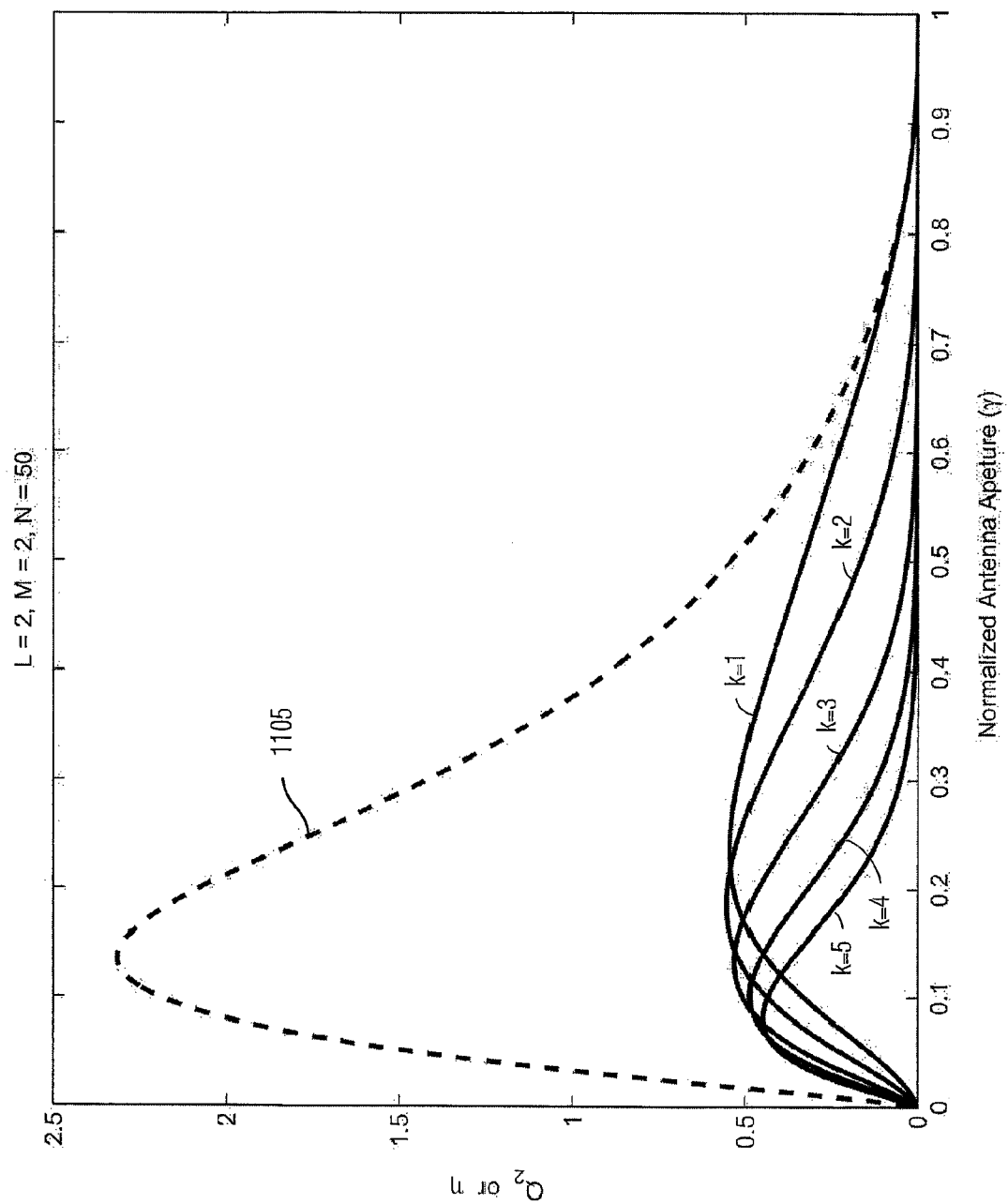
FIG. 11 is a data plot illustrating SCP versus normalized antenna aperture $\gamma$ for different CR transmission link classes.

FIG. 11 is a data plot illustrating SCP versus normalized antenna aperture γ for different CR transmission link classes, with L=2, M=2, and N=50. The solid lines shown in FIG. 11 represent SCP versus γ for different CR transmission link classes and dashed line 1105 represents a summation of all the solid lines. Dashed line 1105 represents an overall SCP in the CR system. As shown in FIG. 11, SCP decreases as a CR transmission link's class increases, which is as expected since greater class means reduced priority. The overall SCP of the CR system (dashed line 1105) indicates that spectrum efficiency of the CR system is greatly increased. Furthermore, as shown in FIG. 11, γ may be different for the different classes. Therefore, an appropriate antenna aperture may be selected based on factors such as a CR user density in the CR system, quality-of-service requirements, transmission link class, and so forth.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting information, the method comprising:
    (1) setting a directional antenna of a transmitter of a cognitive radio system to a first transmission direction;
    (2) determining whether a state of a spectrum band in the first transmission direction is idle or busy;
    (3) transmitting the information in the first transmission direction to a receiver of the cognitive radio system when the spectrum band state is idle and the receiver lies within a coverage area of the transmitter;
    (4) transmitting the information in the first transmission direction to a first relay when the spectrum band state is idle and the receiver lies without the coverage area of the transmitter; and when the spectrum band state is busy:
- (5) determining whether a group of untested transmission directions of the directional antenna is empty or not empty,
- (6) selecting an untested transmission direction from the group of untested transmission directions when the group of untested transmission directions is not empty,
- (7) determining whether the state of the spectrum band in the untested transmission direction is idle or busy,
- (8) transmitting the information in the untested transmission direction to the receiver when the spectrum band state is idle and the receiver lies within a coverage area of the transmitter, and
- (9) transmitting the information in the untested transmission direction to a second relay when the spectrum band state is idle and the receiver lies without the coverage area of the transmitter; and
- (10) when the group of untested transmission directions is empty,
- (11) buffering the information.

2. The method of claim 1, further comprising when the spectrum band state in the untested transmission direction is busy, (12) repeating the elements (5) through (11).

3. The method of claim 1, wherein the directional antenna is an antenna array, and wherein the setting the directional antenna comprises specifying a set of antenna coefficients.

4. The method of claim 1, wherein the setting the directional antenna comprises selecting one of a plurality of directional antennas.

5. The method of claim 1, wherein the determining that the receiver lies within a coverage area comprises determining that the receiver is listed in a database as being within the coverage area.

6. The method of claim 1, wherein the first relay is listed in a database as being able to relay the information to the receiver.

7. The method of claim 1, wherein the first relay is listed in the database as being able to relay the information to a third relay that is able to relay the information to the receiver.

8. The method of claim 1, wherein the determining the state of the spectrum band comprises examining spectrum band usage restrictions.

9. The method of claim 1, wherein the transmitting the information in the first transmission direction to the first relay comprises transmitting the information to the receiver using a multi-hop transmission.

10. A method for transmitting information, the method comprising:
setting a directional antenna of a transmitter of a cognitive radio system to a first transmission direction;
determining whether a state of a spectrum band in the first transmission direction is idle or busy, comprising
filtering a received signal to attenuate signals outside of the spectrum band;
measuring a received energy of the filtered received signal within the spectrum band;
accumulating the measured received energy for a time interval; and
deciding the state of the spectrum band based on a comparison of the accumulated received energy and a threshold;
transmitting the information in the first transmission direction to a receiver of the cognitive radio system when the spectrum band state is idle and the receiver lies within a coverage area of the transmitter; and
transmitting the information in the first transmission direction to a first relay when the spectrum band state is idle and the receiver lies without the coverage area of the transmitter.

11. A method for transmitting information, the method comprising:
setting a directional antenna of a transmitter of a cognitive radio system to a first transmission direction;
determining whether a state of a spectrum band in the first transmission direction is idle or busy; wherein a transmission containing the information is assigned a priority class k, and wherein the determining the state of the spectrum band comprises:
determining that the state of the spectrum band is idle when no active transmission is taking place;
determining that the state of the spectrum band is idle when an active transmission is taking place, the active transmission having a priority class j, wherein priority class j is lower in priority than priority class k; and
determining that the state of the spectrum band is busy when an active transmission is taking place, the active transmission having a priority class i, wherein priority class i is greater than or equal in priority to priority class k;
transmitting the information in the first transmission direction to a receiver of the cognitive radio system when the spectrum band state is idle and the receiver lies within a coverage area of the transmitter; and
transmitting the information in the first transmission direction to a first relay when the spectrum band state is idle and the receiver lies without the coverage area of the transmitter.

12. A method for relaying a transmission, the method comprising:
determining, by a communications relay having a directional antenna, a receiver from the transmission;
determining whether the communications relay is capable of relaying the transmission to the receiver or not,
if the communications relay is capable of relaying the transmission to the receiver,
setting the directional antenna to a first transmission direction,
determining whether spectrum band availability in the first transmission direction is idle or busy,
relaying a corresponding transmission directly to the receiver when the spectrum band is idle and the receiver lies within a coverage area of the communications relay, and
relaying the corresponding transmission to a second communications relay when the spectrum band is idle and the receiver lies without the coverage area of the communications relay; and
discarding the transmission when the communications relay is not capable of relaying the transmission to the receiver.

13. The method of claim 12, wherein the corresponding transmission comprises information similar to information contained in the transmission except with different control information.

14. The method of claim 12, wherein the determining a receiver comprises decoding the transmission.

15. The method of claim 12, further comprising, performing a sequence of actions when the spectrum band is busy, the sequence of actions comprising:
determining whether a group of untested transmission directions of the directional antenna is empty or not empty, selecting an untested transmission direction from the group of untested transmission directions when the group of untested transmission directions is not empty, determining whether spectrum band availability in the untested transmission direction is idle or busy, relaying the corresponding transmission in the untested transmission direction to the receiver when the spectrum band is idle and the receiver lies within a coverage area of the communications relay, and relaying the corresponding transmission in the untested transmission direction to a third communications relay in when the spectrum band is idle and the receiver lies without the coverage area of the communications relay;

when the group of untested transmission directions is empty, buffering the transmission; and when the spectrum band in the untested transmission direction is busy, repeating the sequence of actions.

16. The method of claim 12, wherein the determining that the communications relay is not capable of relaying the transmission to the receiver comprises determining that the receiver is not listed in a database of receivers that the communications relay is capable of making a transmission to.

17. The method of claim 12, wherein the determining that the communications relay is not capable of relaying the transmission to the receiver further comprises determining that a fourth communications relay is not listed in the database, wherein the fourth communications relay is capable of relaying the transmission to the receiver.

18. A communications node comprising:

a receiver coupled to an antenna, the receiver configured to receive signals detected by the antenna;

a transmitter coupled to a directional antenna, the transmitter configured to directionally transmit signals using the directional antenna; and a processor coupled to the receiver and to the transmitter, wherein the processor comprises:

a spectrum sensing unit configured to sense a state of the spectrum band over which signals are transmitted and received;

a message relay unit coupled to the spectrum sensing unit, the message relay unit configured to determine if the intended receiver is within a coverage area of a directional transmission of the transmitter by accessing the database, and to select a relay node of a cognitive radio system capable of relaying the received transmission to the intended receiver if the intended receiver is without the coverage area by accessing the database, and configured to relay a received transmission to the received transmission's intended receiver or to the relay node; and a database generator coupled to the message relay unit, the database generator configured to generate a database containing transmission relaying information based on responses to messages transmitted by the communications node, the database arranged based on a directional transmission of the transmitter.

19. The communications node of claim 18, further comprising a transmission class unit coupled to the message relay unit, the transmission class unit configured to assign a classification to transmissions made by the transmitter, and to determine the state of the spectrum band based on the classification assigned to the transmissions.

20. The communications node of claim 18, wherein the communications node operates in proximity to a communications system having transmission priority over transmissions made by the communications node, the communications node further configured to directionally transmit information to receivers to reduce interference caused on transmissions of the communications system.

21. The communications node of claim 18, wherein the communications system is a licensed communications system, and the communications node is a cognitive radio node.

* * * * *